United States Patent

Leonard et al.

[11] 3,943,863
[45] Mar. 16, 1976

[54] PLANTING MACHINE FOR PLANTING PLANTS IN CLODS

[75] Inventors: Jean Leonard, Bordeaux; Georges Touzet, Nangis, both of France

[73] Assignees: Union Des Cooperatives Forestieres D'Aquitaine (U.C.F.A.), Bordeaux; Association Foret Cellulose (A.F.O.C.E.L.), Paris, both of France

[22] Filed: June 25, 1974

[21] Appl. No.: 482,918

[52] U.S. Cl. ............................... 111/2; 111/89
[51] Int. Cl.² .................................. A01C 11/00
[58] Field of Search ................... 111/3, 2, 4, 89

[56] References Cited
UNITED STATES PATENTS

| | | | |
|---|---|---|---|
| 1,333,339 | 3/1920 | Puckett | 111/2 |
| 1,753,136 | 4/1930 | Scrimger | 111/89 |
| 3,014,441 | 12/1961 | Berg | 111/2 |

*Primary Examiner*—Stephen C. Pellegrino
*Attorney, Agent, or Firm*—Seidel, Gonda & Goldhammer

[57] ABSTRACT

Mechanism for planting plants in soil in standard clods, the entire operation being carried out without manual intervention in selected locations.

It comprises a vertical planting tube 1 suspended from an arm 2 carried by a self-propelled appliance. A mechanisms unit integral with a cage 3 can slide along the tube 1, controlling on one hand the opening and closing of the jaw 5, and, on the other hand, the compaction of the earth.

The invention can be used for transplanting any species of plant under difficult conditions (ground containing stones and tree stumps) or through plastic sheets.

8 Claims, 6 Drawing Figures

Fig.1

PLANTING MACHINE FOR PLANTING PLANTS IN CLODS

The subject of the invention is a machine for planting plants that have been grown in standard pots.

It is known that planting machines of the conventional type used in agriculture and sylviculture consist of a blade which makes a furrow in the ground, a mechanism for depositing plants in the bottom of the furrow, and a member for bringing back earth onto the roots of the plant. Such equipment is carried or pulled by a continuously advancing tractor.

The utilisation of such planting machines with a blade is impossible in all cases in which obstacles prevent a continuous furrow from being made. Thus tree stumps and stones in forest areas which have been levelled and which it is desired to replant, constitute obstacles in the path of conventional planting machines. Likewise, in agriculture, the presence of sheets of plastic material for controlling weeds, prevents planting, as is the case with various market garden crops, among which are strawberries.

There are manual planting tubes on the market, consisting of a hollow tube, of which the lower end is provided with a jaw. This latter is intended to facilitate the penetration of the tube into the ground, thanks to the angle shape it assumes when it is closed. After the tube has been driven onto the ground, the jaw is opened, so causing a hole of geometrical shape to be formed in the ground. The plant, whose roots must be held in clod of corresponding shape, is introduced through the hole in the tube and made to conform to the previously formed cavity. The consolidation of the earth around the plant is effected with a heel, after the planting tube has been extracted. The conveyance of the plants, the preparation of the hole and consolidation of the earth, is effected by the muscular energy of the operators involved. This operation procedure is suitable for land with obstacles, but is slow and laborious.

The object of the present invention is to overcome the disadvantages of the devices existing up to now by providing a planting machine for mounting on an agricultural tractor, capable of planting plants in selected places, without obstacles in or on the ground interfering with its operation.

This result is obtained, according to the invention, by mounting on the end of an articulated arm fixed to a tractor, a planting tube, along which a mechanisms unit integral with a cage can slide. The arm is operated by an appropriate device such as a hydraulic jack, which provides the energy required for the operation of the planting machine.

An embodiment of a machine for planting plants in standard clods, in accordance with the invention, will be described hereafter, by way of non-limitative example, with reference to the accompanying drawings. In these drawings.

Figure 1:
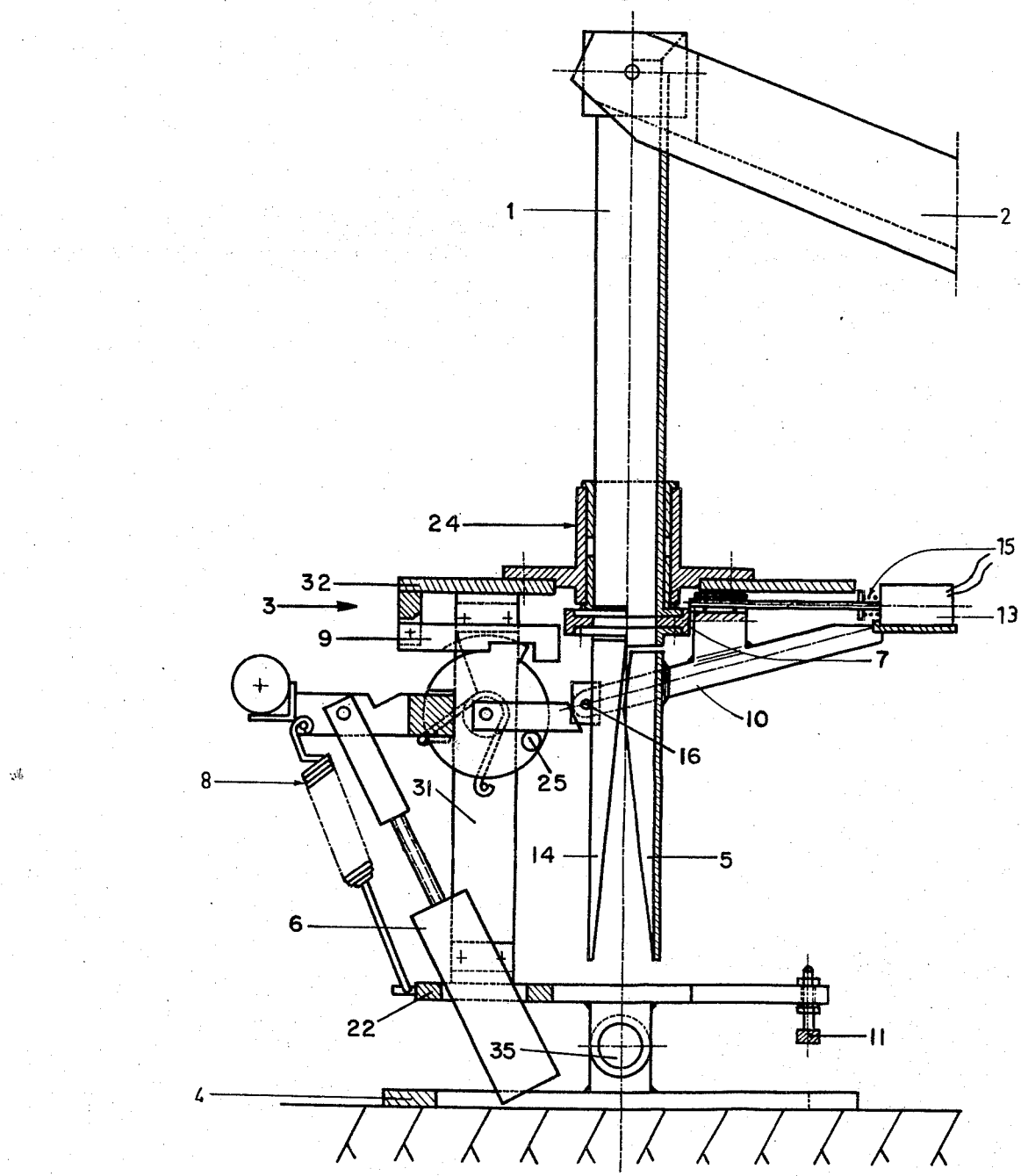
FIG. 1 is a schematic section showing the relative position of the various components of the planting machine in the transport position, before the jaw has closed.
Figure 2:
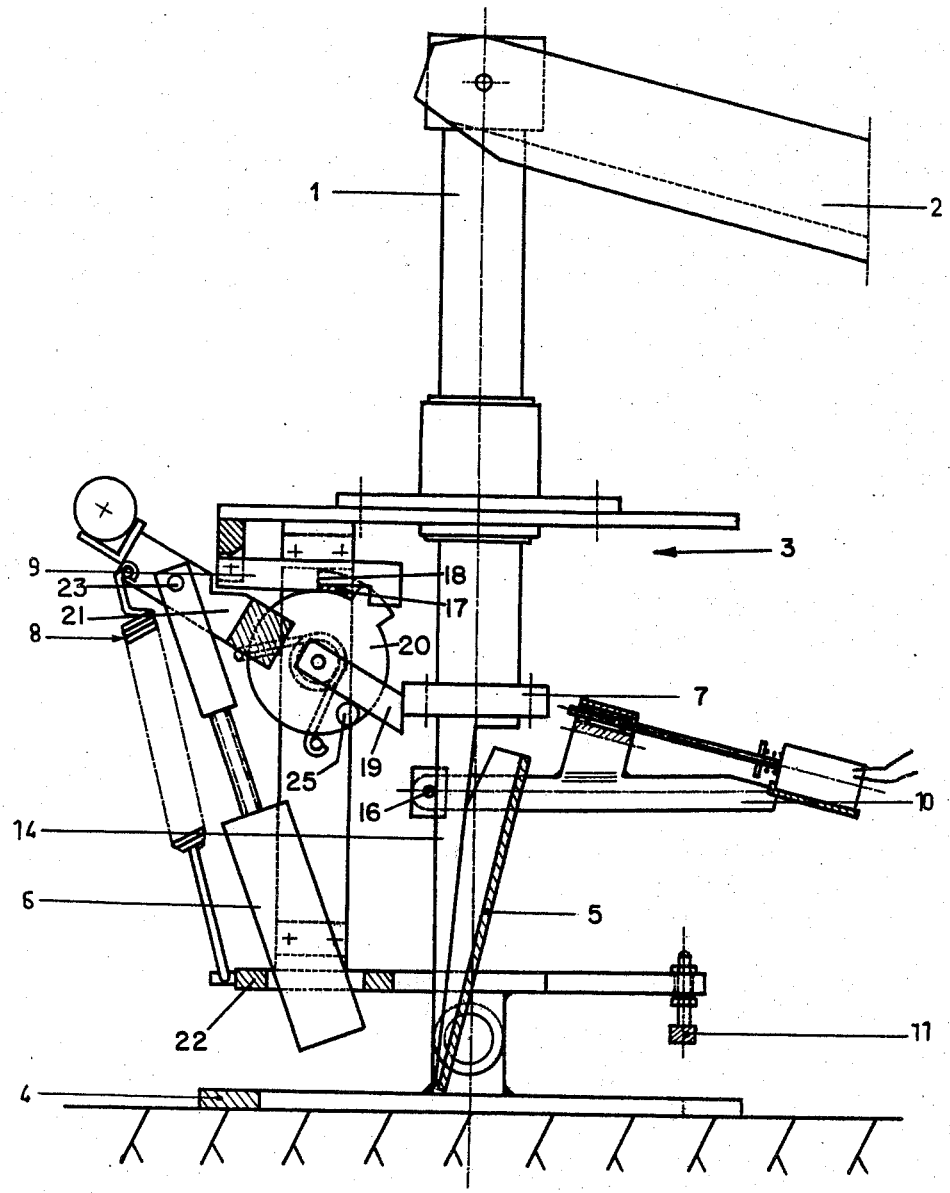
FIG. 2 is a section showing how the energy required for consolidation is stored on one of the three accumulators arranged respectively at 120°.
Figure 3:
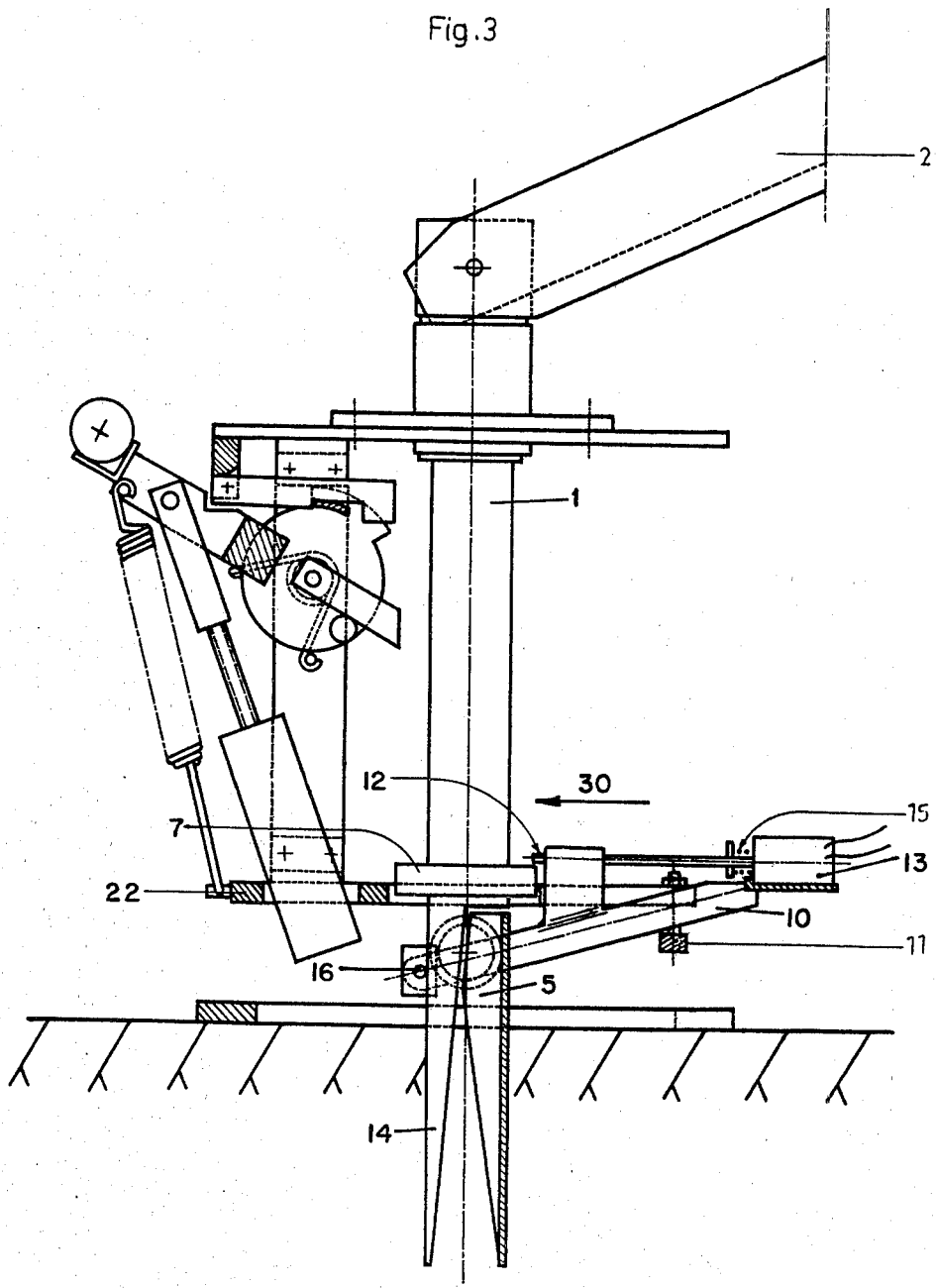

FIG. 3 details the opening process of the jaw.

Figure 4:
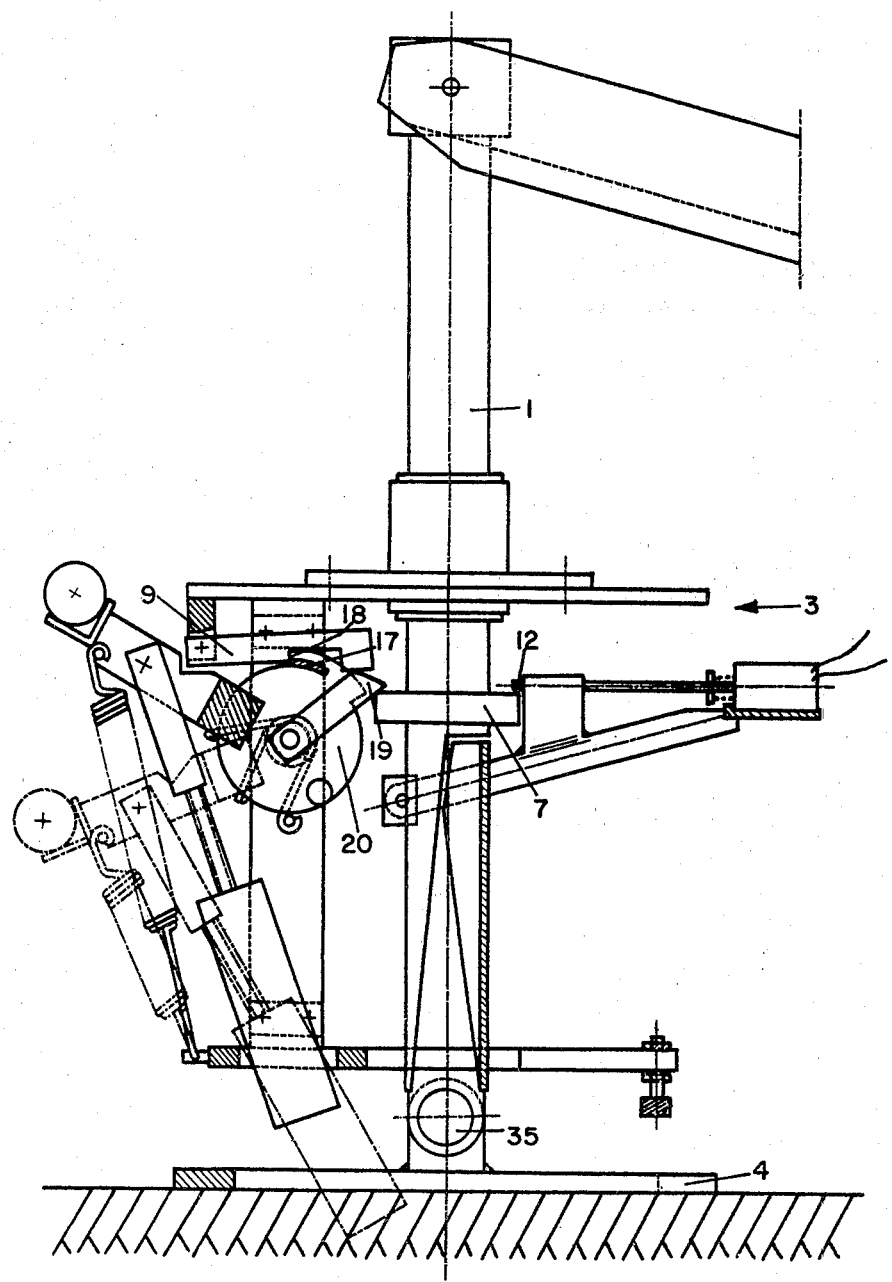

FIG. 4 shows the process involved in unlocking the consolidation weights.

Figure 5:
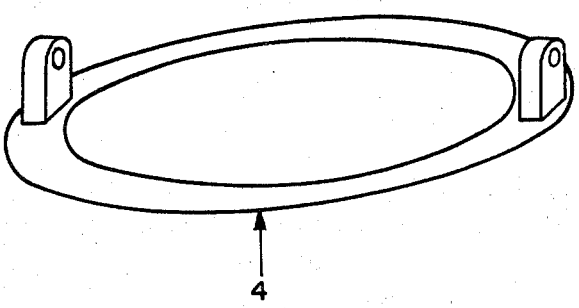

FIG. 5 is a perspective view of the base 4 on which the cage 3 pivots.

Figure 6:
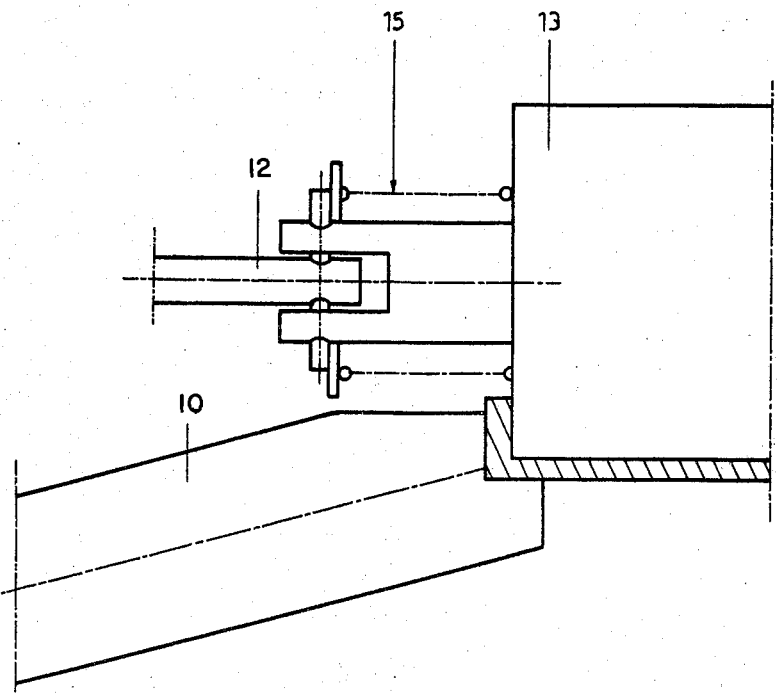

FIG. 6 shows the unlocking system of the movable jaw on a 1/1 scale.

The movement of the jaw 5 which causes a cavity to be formed in the ground and in which the plant is placed, is controlled by an assembly of mechanical joints and cams, assembmed in the form of a cage 3 fitted to the tube 1 and through which the tube can slide.

In addition, the cage 3 comprises consolidation devices 6 which apply earth around the plant as soon as the latter has been put into the ground.

The planting tube support on the tractor is stopped above the point where the plant is to be put into the ground.

After a plant has been placed in the planting tube 1, the driver lowers the support arm 2. The planting cage 3 comes into contact with the ground by its base 4 and stops there. The planting tube 1 is pushed through the cage 3 by the support arm 2 actuated by the jack. In its descending movement, the tube 1, which carries a collar 7, loads the springs 8 of the consolidation weights 6. These weights 6 stay in the high position, the mechanism being locked by the catch 9.

The planting tube 1, in its closed position, penetrates into the ground and then, at the end of its course, an arm 10 integral with the movable jaw 5 comes into contact with an abutment 11 carried by the cage. The jaw opens and the plant falls into the cavity that has been made. The movable jaw is locked in its open position by a nipple 12 applied by a spring 15.

The movement of the jack is then reversed. The planting tube 1 is pulled upward. It slides through the cage 3, its weight maintaining the latter on the ground. In passing, the collar 7, with which it is provided, causes the consolidation weights 6 to be unlocked which are then projected onto the ground and compact the earth around the plant.

The course of the tube 1 through the cage 3 is limited by the collar 7, which pulls the cage from the ground during the last phase of the ascending operation.

The cage, being in its maximum high position, it is possible to unlock the jaw 5 by actuating an electromagnet 13, which causes the nipple 12 holding the movable jaw 5 in position to retract. By reason of its weight, the latter is applied against the fixed jaw 14.

The operator feeds another plant into the tube, and moves the tractor to the next planting point.

The cage is provided at its lower part with an articulated base 4 which enables it to rock in a plane perpendicular to that of the push of the support arm 2. The base 4 conforms to the irregularities of the ground and enables the cage to to pivot in order to follow the movement of the arm 2 and the arm 1.

What we claim is:

1. A mechanism for planting plants in soil in standard clods comprising a cage means, a planting tube, said tube being guided by said cage means for vertical reciprocatory movement, a support arm adapted for connection to a self-propelled vehicle and being connected to said tube, said support arm having means to reciprocate said tube, jaw means attached to the lower end portion of said tube to produce a hole in soil, means for opening and closing said jaw means upon reciprocation of said tube, soil compacting weights connected by cam means to said cage means, means for raising said weights when said tube descends and for releasing said weights when said tube ascends to compact soil about a plant inserted into said hole, said latter means including said cam means positioned for actuation by reciprocating movement of said tube.

2. A mechanism according to claim 1 further comprising a collar carried by said tube, said collar supporting said cage means when said cage means is lifted off the ground.

3. A mechanism according to claim 2, wherein said means for raising and releasing said weights is actuated by said collar during reciprocating movement of said tube.

4. A mechanism according to claim 1 further comprising spring means connected to said weights and to said cage means, said spring means being stretched by said means for raising said weights when said tube descends and being released by said means for releasing said weights when said tube ascends, whereby said weights are propelled to compact the soil around the plant.

5. A mechanism according to claim 1 wherein said jaw means comprise a fixed jaw and a movable jaw having an integrally attached arm, said attached arm pivotably connected to said fixed jaw, whereby said movable jaw opens as said attached arm contacts an adjustable abutment attached to said cage means when said jaw means nears the end of its descent into soil.

6. A mehcanism according to claim 5 including a locking mechanism carried by said attached arm for locking said movable jaw in an open position when said tube begins its ascent.

7. A mechanism according to claim 6 including means for closing said movable jaw when said tube is at a height sufficiently above that of the plant to prevent damaging the plant.

8. A mechanism according to claim 1 wherein said cage means is pivotably connected to a base by a pin which is perpendicular to the plane of action of said tube and said support arm.

* * * * *